Jan. 7, 1936.  E. G. LOOMIS  2,027,185
MIXING MACHINE
Filed June 15, 1934   2 Sheets-Sheet 1
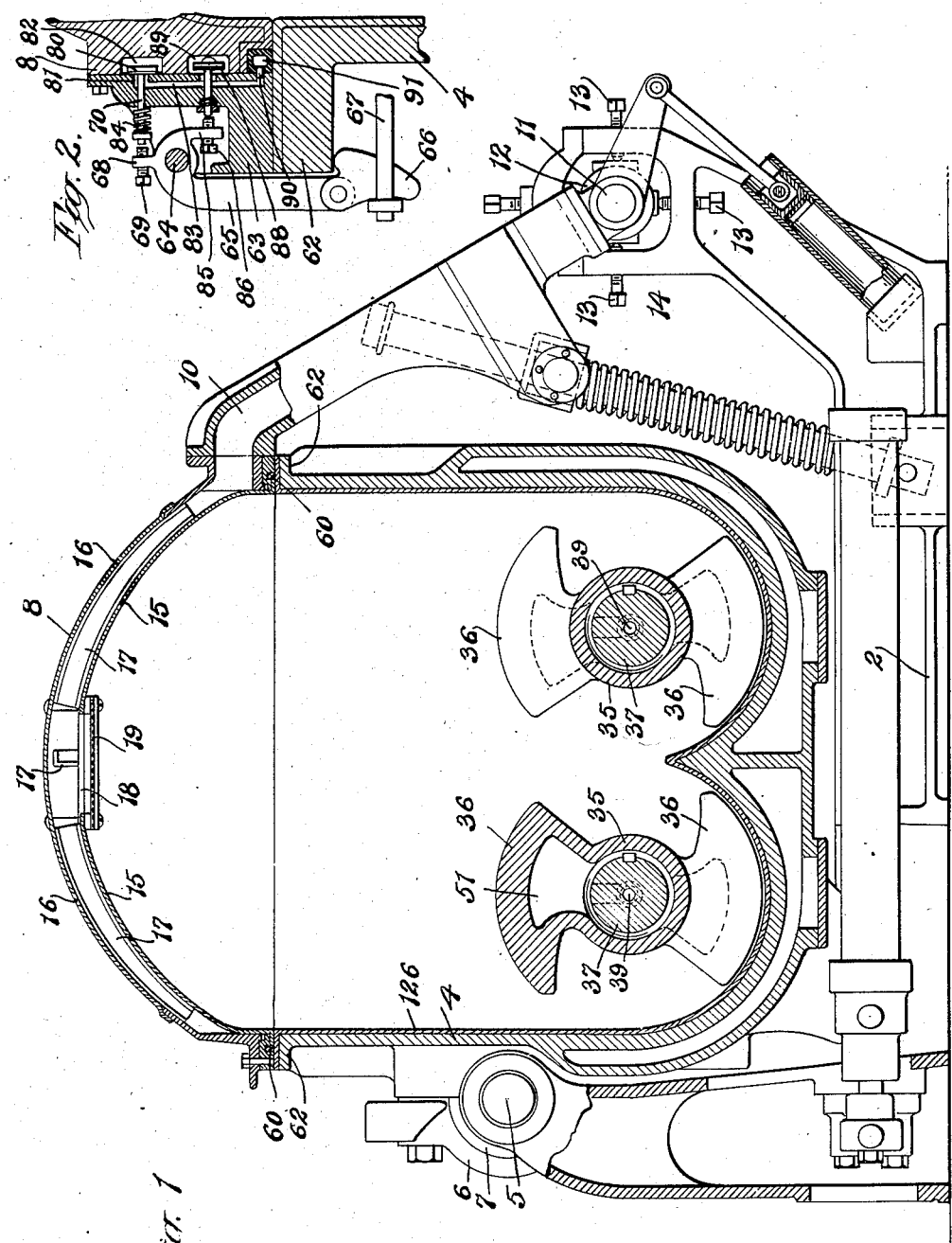
INVENTOR
Evarts G. Loomis
BY
Harry Radzinsky
ATTORNEY Jan. 7, 1936.  E. G. LOOMIS  2,027,185
MIXING MACHINE
Filed June 15, 1934   2 Sheets-Sheet 2
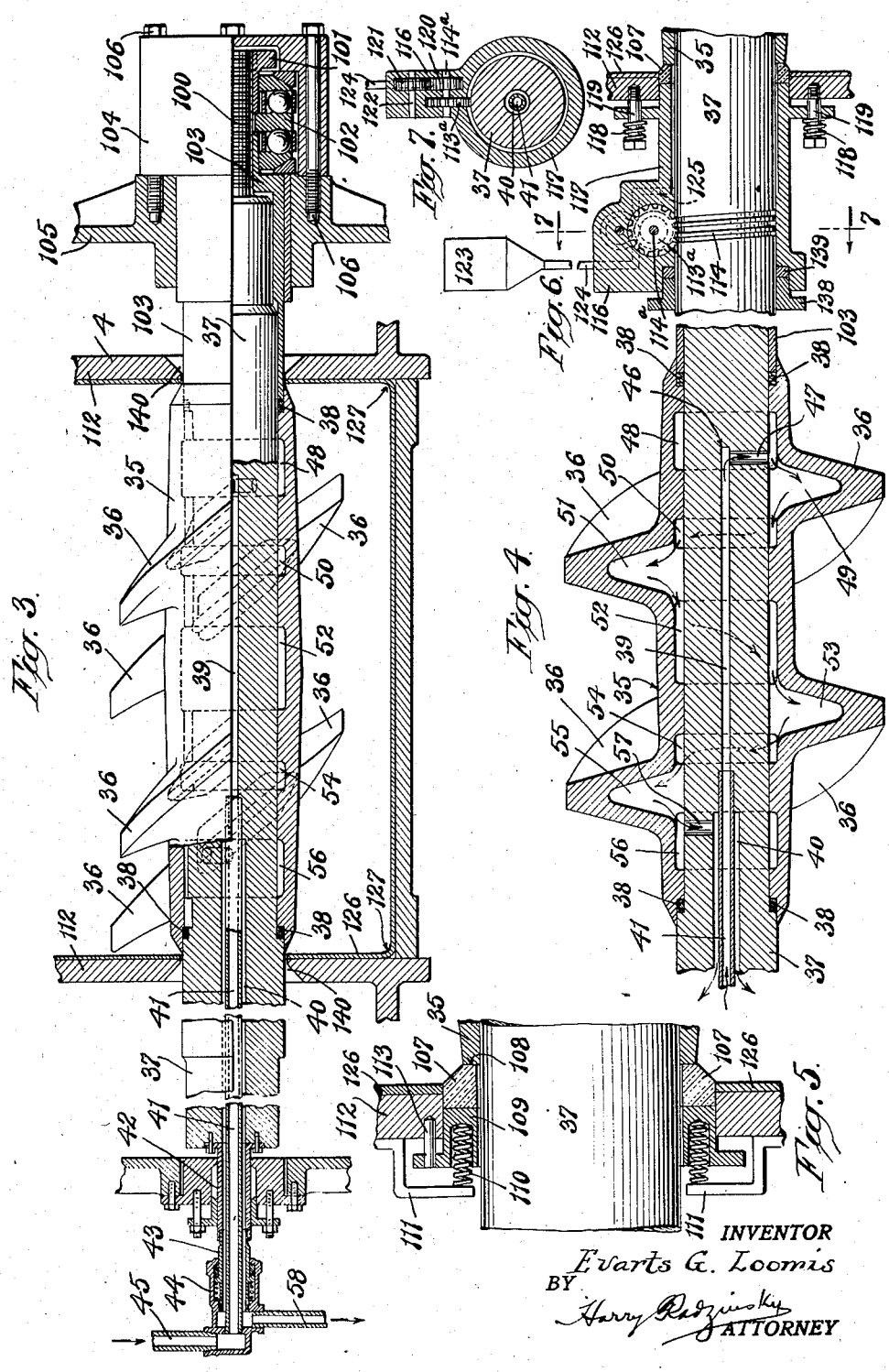
INVENTOR
Evarts G. Loomis
BY
Harry Radzinsky
ATTORNEY Patented Jan. 7, 1936

2,027,185

UNITED STATES PATENT OFFICE 2,027,185

MIXING MACHINE

Evarts G. Loomis, Newark, N. J.

Application June 15, 1934, Serial No. 730,693

6 Claims. (Cl. 259—104)

This invention relates to an improvement in vacuum mixing machines which may be similar to that shown and described in my patent No. 1,673,085, dated June 12, 1928. The machine therein shown is particularly adapted for mixing any materials where a temperature control is important, such as when there are one or more volatile constituents, the contents of which it is desired to reduce.

One of the objects of the invention is to provide an improved mixing blade or paddle and mounting therefor. The structure of the blade is such that it may be internally uniformly heated or cooled by the circulation of a heating or cooling fluid through it, whereby the material being operated upon may be resultantly uniformly heated or cooled during the mixing operation. The improved mounting for the mixing blade is such that the blade may be easily placed in position without requiring disassembly of the trough in which the blades operate, so that the trough or its lining may therefore be seamless and provided with rounded ends and corners which greatly facilitate the operation of cleaning the trough, and also aids materially in keeping the trough clean.

When the trough is provided with smooth, rounded internal surfaces, without cracks, seams or corners, free and unimpeded movement of all of the material acted upon by the mixing blades is possible, which permits a uniform mixing of all of the contents of the trough.

A further improvement in the construction of the mixing blades resides in the new arrangement of the blades, their drive shafts and the manner in which they are supported. The improved construction of the blades is such that they are formed with individual internal cavities for temperature control circulation. These cavities are so arranged that when a blade member is secured on its shaft, the heating or cooling fluid passed through the shaft and through the blade cavities, will not by-pass one or more of the cavities in the fins on the blade and render unreliable the uniformity of temperature. The cavities are so arranged that when the shafts are removed from the blade members and without any further dismantling of parts, the individual blade cavities and cored connections between the cavities are fully open and readily accessible for cleaning and inspection.

These and other objects are attained by my invention, a particular description of which is hereinafter set forth and more particularly pointed out in the claims appended hereto.

In the accompanying drawings, forming a part hereof, Fig. 1 is a transverse section of the improved machine; Fig. 2 is a sectional view through a part of the tank and cover, showing the means for obtaining a seal between the upper end of the tank and the cover; Fig. 3 is a side elevation, with parts in section, of one of the mixing blades or paddle members, and associated parts; Fig. 4 is a longitudinal sectional view of one of the blades, diagrammatically illustrating the course of the heating or cooling fluid directed through the blade; Fig. 5 is a vertical sectional view through a part of the tank and paddle member shaft, showing the means employed for attaining a seal at the junction of the shaft and the tank; Fig. 6 is a sectional view, showing means for lubricating the type of sealing means disclosed in Fig. 5; and Fig. 7 is a sectional view on the line 7—7 of Fig. 6, looking in the direction of the arrows.

The improved mixing machine is provided with a fixed supporting base or frame 2, and a swinging frame which carries most of the gears, shafting and mixing chamber or tank 4, and the contents thereof. The movable frame is pivoted about the axis of the main shaft 5 and the mixing chamber 4 has bearings 6 that turn on trunnions 7 fixedly connected to the base 2. There is also a swinging cover 8 which is clamped down at the front by suitable fasteners, one of which is shown in Fig. 2, and is connected at its rear to a tube 10 which is connected at its lower end to a pipe 11 turning in bearings 12 which are supported by adjustable screws 13, in turn supported by the brackets 14 forming an integral portion of the frame 2.

The cover 8 is formed of two somewhat similar, spaced concavo-convex plates 15 and 16; these plates may be held in spaced relationship by radially extending braces 17 which also serve to strengthen the cover. The inner cover plate 15 is provided with a central aperture 18 covered by a foraminous sheet or screen 19. During the mixing operation, vapors arising from the mixture in the chamber 4 may ascend through the screen 19 passing through the opening 18 and entering into the space between the two cover plates 15 and 16. Liquid formed by condensation of these vapors will gather on the under face of the upper cover plate 8 and will trickle down through the space or passage formed between the two plates and pass out through the connected pipes 10 and 11.

In Fig. 1 the top of the mixing chamber or tank is shown as being smooth so that it may uniformly contact with a sealing ring 60 carried by the cover and a tight joint formed between the body of the mixing chamber 4 and the cover 8. It sometimes occurs, however, that pieces of the substances being mixed fall upon the upper end or top edge of the chamber and consequently a tight seal between the cover and chamber is not always attained. As a remedy for this, the structure shown in Fig. 2 is employed. There, the edge of the cover 8 is provided with a bracket 63 on which a lever 65 is pivotally hung at 64. The lower end of lever 65 is pivotally connected to a catch 66 adapted to engage beneath the lower edge of the flange 62 formed on the upper end of the mixing chamber 4. Catch 66 is engaged by a rod 67 forming part of the cover-clamping mechanism, shown in detail in my Patent No. 1,673,085. At its upper end, the lever 65 is formed with a lug 68, through which an adjustable tappet 69 extends, and upon rocking movement of the lever 65 as will be hereinafter explained, said tappet contacts with the end of a valve stem 70 formed on a valve 80 which closes a port 81 connecting an exhaust passage 82, formed in the top of the cover 8, with a passage 83 formed in the bracket 63. The valve 80 is spring pressed by the spring 84 to hold it in a normally closed condition. The lever 65 is also provided with a lug 85 carrying an adjustable tappet 86 which upon a closing movement of the lever 85 presses against the stem of a spring pressed valve 88 which connects an inlet passage 89 with the passage 83. Secured to the lower end of the passage 83 by a nipple 90 is an inflatable rubber ring 91.

From the foregoing, the operation of the structure shown in Fig. 2 will be readily understood. When the rod 67 is drawn toward the right of Fig. 2 by means of suitable connecting elements, it draws the catch member 66 inwardly under the flange 62 and it tends to rock the lever 65 on its pivot 64 to cause the tappet 86 to exert pressure against the stem of valve 88, causing the valve to open. The passage 89 is connected to a source of air pressure so that upon the opening of the valve 88 air will enter through passage 89 and will reach the passage 83 and pass therethrough to reach the interior of the inflatable ring 91 to inflate the ring a sufficient amount to produce an efficient seal between the cover member 8 and the flange 62 at the top of the mixing chamber. When the catch 66 is released by movement of the rod 67 toward the left, the lever 65 swings about the pivot 64 in a clockwise direction, when viewed as in Fig. 2, to cause the tappet 69 to press against the valve stem 70 and open the valve 80. This permits the escape of air in the ring 91 through passages 83 and 81 to reach the exhaust passage 82. With this arrangement, an effective seal is secured between the cover and top of the mixing chamber, each time that the cover seats in position on top of the mixing chamber 4.

The mixing blades or paddles which rotate within the mixing chamber are driven by suitable gearing not shown herein as it forms no part of the present invention, but is fully described in my Patent No. 1,673,085.

Each of the paddle members consists of a tubular body 35 provided with a plurality of integrally formed, hollowed-out blades 36. The paddle member is keyed upon a shaft 37 which is hollow for a part of its length and which has its ends projecting beyond the sides of the mixing chamber as shown in Fig. 3. The paddle member 35 is made of stainless steel or some similar non-corresive metal and it extends over and completely covers that portion of the shaft 37 disposed within the tank. A packing 38 located at each end of the paddle member prevents entry in the mixing chamber of contents between the body of the paddle member and the shaft 37.

Extending partly through the shaft 37 is a longitudinal passage 39 which for a portion of its length is of increased diameter as at 40. Disposed within the widened portion 40 of the passage is a tube 41 which extends out of one end of the shaft through the bushing 42 and connected nipple 43 on the swing-joint 44. A pipe 45 connects to the tube 41 through the swing-joint as clearly shown in Fig. 3. Steam or other heating or cooling fluid forced through pipe 45 will pass through the tube 41 and into the passage 39 of the shaft 37. At the closed end 46 of passage 39 is provided a radially extending port 47 which communicates with an annular chamber 48 formed in the interior of the tubular body of the paddle member 35. Said chamber 48 communicates with the hollow interior 49 of one of the blades 36 which in turn communicates with an annular chamber 50 leading into the hollow interior 51 of a second blade. The space 51 communicates with an annular chamber 52 connecting with the interior 53 of the third blade, this space 53 communicating with the annular chamber 54. Chamber 54 connects with the interior 55 of the fourth blade which communicates with the chamber 56. A port 57 extending radially from the portion 40 of the longitudinal passage in the shaft, connects with chamber 56. The tube 41 is of lesser diameter than the passage 40 and is concentrically located with respect thereto so that space is provided within the passage 40 for the exhaust of steam or other fluid which passes out of the passage 40 and finally out of the exhaust pipe 58.

In case the paddle member is formed with more or less blades than the amount shown, the same internal "bottle-cored" arrangement of the body of the paddle member, and hollowed-out construction of the blades is followed so that a continuous fluid passage through the paddle member is provided.

At its right end, as viewed in Fig. 3, the shaft 37 is threaded as indicated at 100 to receive a nut 101 which impinges against a thrust bearing collar 102 which exerts pressure against a sleeve 103 forcing the end of said sleeve to compress the packing 38 at the right hand end of the paddle member. The pressure of the sleeve 103 through the packing 38 forces the paddle member slightly to the left to compress the packing 38 located at the left end of the paddle member. In this manner, a tight fit between the paddle member and the shaft 37 at both ends of the paddle member is attained and leakage between these elements is prevented. A cover member or cap 104 encloses the end of the shaft 37 and the bearing 102, the cover member being held on the frame portion 105 by means of the cap screws 106.

The shaft 37 may be mounted in suitable bearings and driven by suitable gearing, not herein shown since such bearings and gearing are fully shown and described in my prior Patent No. 1,673,085.

In Fig. 5 is shown a means by which an effective seal may be secured between the ends of the tubular body of the paddle member 35 and the walls of the mixing chamber or tank 4. At 107 is shown a sealing member consisting of a ring or annulus of hard, smooth, slippery-surfaced material, such as polished hardened steel, metal, alloy, glass, quartz or the like. The member 107 may be in the form of a continuous annulus or it may be composed of several segments placed together with their ends in closely fitting contact, flat or overlapping as is common in split glands, washers or gaskets. The surface or inner face 108 of the member 107 bears against the end of the body portion of the paddle member, and as the end of the paddle member and the surface 108 are both highly polished and smooth, an anti-friction contact may be assured. At the same time the contact between the paddle member and surface 108 is in the nature of a seal and is such that leakage inwardly towards the shaft is preventable. The member 107 is maintained in contact with the end of the body of the paddle member by means of an annulus 109 surrounding the shaft 37 and pressed inwardly against the member 107 by means of spaced coil springs 110 which seat in recesses in the ring 109 and are held therein by means of the brackets 111 secured to the wall 112 of the mixing chamber. One or more pins 113 extend from the wall 112 and project into free recesses formed in the ring 109 and thus prevent rotative movement of the ring 109 and springs 110 engaging the same.

In Figs. 6 and 7 is shown means for effectively lubricating or separating from possible abrasion or heating, the abutting surfaces of the glass or like member 107 and the end of the paddle member 35. A gear pump is there shown having a driving pinion 113a which engages worm threads 114 on the shaft 37. The pinion 113a is mounted on a shaft 114a rotating in a part 116 forming an extension on a sleeve 117 surrounding the shaft 37. The springs 118 surrounding studs 119 hold the sleeve 117 resiliently against the glass ring 107 to cause it to be pressed against the end of the paddle member 35. The shaft 114a carries a pinion 120 which meshes with and drives an upper pinion 121 secured on a shaft 122. At 123 is indicated a reservoir which is adapted to contain castor oil or some similar non-corrosive or non-soiling lubricant or fluid. A pipe 124 leads from the tank 123 and feeds the fluid to the gears 120 and 121, these two gears forcing fluid through a passage 125 to the surface of the shaft 37 which carries the lubricant to the member 107 and forces it between the clearance surfaces of the member 107 and the end of the shaft 37. In this manner, a constant amount of fluid is forced between the ring 107 and the end of the paddle member 35 so that friction between these parts is avoided and a satisfactory seal between them is assured. A gland 138, maintaining a packing 139 in position, prevents leakage of the lubricant or fluid at the end of the shaft 37.

From the foregoing, the manner in which the improved mixing machine is used will be readily understood. The general operation thereof is as described in my previous Patent No. 1,673,085. To change or replace one of the paddle members is relatively simple. The body portion of the paddle member is of such length that it may be introduced within the walls 112 of the mixing chamber 4 into the chamber. The shaft 37 slides through the openings 140 (Fig. 3) in these walls and passes through the paddle member. With this arrangement, the mixing chamber or tank may be seamless, or at least have an inner seamless lining such as indicated at 126. It will be seen, particularly in Fig. 3, that the lining 126 may be provided with smooth rounded corners such as indicated at 127, so that it is impossible for particles of the substance to be mixed to lodge in these corners and the tank or mixing chamber may be very easily kept clean. While the paddles are rotating a constant flow of either heating or cooling fluid can be passed through the paddle members, including the blades 36 thereof, so that the mixture acted upon by the paddles is maintained at or readily varied to a temperature as desired.

An effective seal is maintained between the cover of the tank and its body by means of the structure shown in Fig. 2, where the inflatable sealing ring 91 is automatically inflated by the mere act of closing the clamping means. These and other novel results are attained by the improved structure.

What I claim is:

1. In a machine of the class described, a mixing chamber, a shaft extending through the chamber and having an end projecting out of the same, a paddle member having a tubular body of a length less than the distance between the walls of the mixing chamber so that said paddle member may be placed within the chamber through the open top thereof without dismantling the chamber, means for securing the paddle member on the shaft, said paddle member having blades and a continuous fluid passage extending through its tubular body and through the blades, a passage extending through the shaft and connecting with one end of the passage extending through the body of the paddle member, and an exhaust passage leading from the opposite end of the tubular body portion and passing through and out of the shaft.

2. In a machine of the class described, a mixing chamber, a shaft extending through the chamber and having its ends projecting out of the same, a paddle member having a tubular body of such a length that it may be introduced within the chamber without dismantling the chamber, means for securing the paddle member on the shaft, said paddle member having blades and a continuous fluid passage extending through its tubular body and through the blades, a passage extending through the shaft and terminating short of one end of the same, said passage having a transverse part connecting with one end of the passage extending through the body of the paddle member, and an exhaust passage leading from the opposite end of the passage through the tubular body portion and passing through and out of the shaft.

3. In a machine of the class described, a mixing chamber, a paddle member which may be introduced into the mixing chamber without dismantling the chamber, a shaft extending into the chamber and adapted for insertion into the chamber and into the paddle member by movement in the direction of its axis, means for securing the paddle member on the shaft, said paddle member having a series of blades and a tubular portion from which said blades extend, said blades being provided with separate interior cavities for the circulation of a fluid, said cavities extending radially beyond a series of annular chambers formed in the tubular portion of the paddle member, which annular chambers alternately connect the opposite ends of each succeeding blade cavity, the shaft being provided with channels through which a circulating fluid passes and connection openings leading from the shaft channels to paddle cavities located at the opposite ends of the channels.

4. In a machine of the class described, a mixing chamber, a shaft mounted for rotation in said chamber, a paddle member secured on the shaft and located within the chamber, said paddle member having a series of blades and a tubular portion from which said blades extend, said blades being provided with separate interior cavities for the circulation of a fluid, said cavities extending radially beyond a series of spaced annular cavities formed in the tubular portion of the paddle member, said annular cavities alternately connecting the opposite ends of each succeeding blade cavity, the shaft having an inlet passage leading to the connected blade cavities and annular cavities, and also having an exhaust passage through which the fluid may egress after having passed through the connected blade cavities and annular cavities.

5. In a machine of the class described, a paddle member provided with a tubular part having its internal bore enlarged at intervals to provide spaced annular cavities of greater diameter than its normal bore, said paddle member having several radially extending hollow blades, the hollow interiors of said blades alternately connecting with the opposite ends of each succeeding annular cavity so that when a shaft of uniform diameter is fitted within the tubular part of the paddle member, the co-operating annular cavities and hollow blade interiors will form a continuous fluid passage.

6. In a machine of the class described, a mixing chamber, a shaft extending through the chamber and mounted near each of its ends in the chamber walls and having its ends projecting beyond said walls, a paddle member having a tubular body extending substantially from one wall of the chamber to the other wall and being capable of being introduced within the chamber and between its walls without dismantling the chamber, means for securing the paddle member on the shaft, said paddle member having spaced hollow blades, the tubular body of the paddle member having cored out, spaced annular cavities connecting with the hollow interiors of the blades and forming a continuous fluid passage extending through the body of the paddle member and through the blades, the shaft having a passage extending through it and connecting with one end of the fluid passage extending through the body of the paddle member and blades.

EVARTS G. LOOMIS.